United States Patent [19]

Cannon et al.

[11] 4,117,274

[45] Sep. 26, 1978

[54] KEY TELEPHONE PRIVACY CIRCUIT

[75] Inventors: Thomas Burt Cannon, Thornton; Robert Forcier Metz, Boulder; James Louis Simon, Northglenn, all of Colo.

[73] Assignee: Bell Telephone Laboratories, Incorporated, Murray Hill, N.J.

[21] Appl. No.: 428,067

[22] Filed: Dec. 26, 1973

[51] Int. Cl.² .................................... H04M 1/68
[52] U.S. Cl. .................................... 179/99; 179/17 B
[58] Field of Search ............ 179/99, 17, 17 B, 18 BH, 179/19, 30, 31, 38, 18 AB

[56] References Cited

U.S. PATENT DOCUMENTS

| | | | |
|---|---|---|---|
| 3,299,217 | 1/1967 | Burns | 179/99 |
| 3,385,935 | 5/1968 | Anderson et al. | 179/99 |
| 3,499,121 | 3/1970 | McIntosh et al. | 179/17 B |
| 3,514,544 | 5/1970 | Chambers, Jr. | 179/17 B |
| 3,725,601 | 4/1973 | Jetzt et al. | 179/99 |

FOREIGN PATENT DOCUMENTS

| | | | |
|---|---|---|---|
| 26,042 | 7/1971 | Japan | 179/99 |
| 6,604,065 | 4/1966 | Japan | 179/17 B |

*Primary Examiner*—Kathleen H. Claffy
*Assistant Examiner*—Gerald L. Brigance
*Attorney, Agent, or Firm*—David H. Tannenbaum

[57] ABSTRACT

A privacy circuit for use in a key telephone station set is disclosed. Using only a single relay, the privacy circuit operates to exclude the user from a busy central office line while allowing the user to gain access to an idle line. The privacy circuit is positive acting and cannot be circumvented by manipulating the keys and/or switchhook while at the same time allowing service to continue during a local power failure. Additional circuitry is provided to allow conference connections among key telephone sets equipped with privacy circuits.

4 Claims, 3 Drawing Figures

$t_0$ = BD CONTACT OPENS WHEN A LINE KEY IS DEPRESSED
$t_1$ = LINE KEY A LEAD CONTACTS MAKE
$t_2$ = BD CONTACT CLOSES

KEY TELEPHONE PRIVACY CIRCUIT

BACKGROUND OF THE INVENTION

This invention relates to key telephone arrangements and, more parituclarly, to a privacy circuit for use in a key telephone station set for preventing a key telephone subscriber from intruding on a telephone conversation existing on a central office line appearing at the key telephone station set.

DESCRIPTION OF THE PRIOR ART

In a key telephone system where each station is equipped with multiple line pickup capability, a subscriber at any station can interrupt or eavesdrop on an existing telephone conversation on any of the lines by lifting the handset of a key telephone station set and depressing the key associated with the line on which the conversation is taking place. In order to prevent such an unwanted intrusion, many key telephone systems are equipped with privacy circuit arrangements.

Such privacy circuits must be designed to meet a number of basic requirements, one such requirement being automatic operation when the subscriber attempts to place a call. Additionally, the privacy circuit should be designed such that the subscriber is not able to bridge a busy line by first depressing the key associated with the line and then going off-hook, or vice versa, or by doing both simultaneously.

Furthermore, since key telephone systems are typically located on subscriber premises and use subscriber-provided (local) power, the privacy circuit should use a minimum of relays in order to consume as little power as possible. Also, since the mounting space provided at subscriber premises for key telephone equipment is limited, the privacy circuit should be designed to be mounted in the key telephone set itself.

Additionally, the privacy circuit should be failsafe during local power failure, i.e., allow at least limited telephone operation during a local power failure. If the privacy circuit is designed so as to operate a relay to make interconnection with an idle central office line, the relay cannot operate in the event of a local power failure, and the telephone becomes totally inoperative.

Numerous attempts in the past have been made to satisfy some or all of these requirements. One of these attempts is a type of privacy, called exclusion, which is used primarily in a boss-secretary situation. In such an arrangement, the boss's telephone is equipped with a pull-up switchhook which, when operated, prevents the secretary from intruding upon the connection. However, this exclusion arrangement does not operate automatically and cannot provide complete privacy since operation is based on a hierarchy principle where if two or more subscribers have access to the line, only one subscriber can exclude all other subscribers (i.e., the boss can exclude the secretary but the secretary can never exclude the boss).

Another type of prior art privacy is described in U.S. Pat. No. 3,651,274, issed to R. J. Angner et al on Mar. 21, 1972. The Angner disclosure teaches an automatic lock-out arrangement for private line selective signaling systems comprising common control circuitry for transmitting lock-out tones to all circuits on the line other than the first off-hook station. In this arrangement, relatively sophisticated common control equipment is required to provide lock-out tones and to detect the busy-idle status of the stations. Furthermore, additional relay and gating circuitry is associated with each station to effect the required lock-out in response to the received tones.

U.S. Pat. No. 3,725,601, issued to J. J. Jetzt et al on Apr. 3, 1973, discloses an all solid state privacy circuit which uses voltage potentials on the T and R line leads to determine the busy-idle status of that line. This arrangement comprises a pair of transistors connected in the T and R leads of the line, which transistors act as voltage switches to provide privacy. While Jetzt is a significant advance in the art, the Jetzt arrangement is sensitive to line transients and voltage surges thereby requiring additional protective circuitry mounted outside the key telephone set.

Another type of prior art privacy circuit comprises an arrangement using two relays and associated transistor circuitry located in each key telephone set. One relay operates when the key telephone set switchhook is closed, that is, when the handset is lifted off the cradle, while the other relay operates only when the line key is depressed and the associated line is idle. Each relay operates individually to break the connection between the key telphone set and the associated line, while the dual operation of both relays is required to make the proper connection. While such an arrangement prevents the subscriber from defeating the privacy circuit by first operating the switchhook and then operating the line key or vice versa, the arrangement requires the oeration of two relays to make each a connection, thereby consuming power while the conversation is taking place. Moreover, since relays are relatively large pieces of apparatus and since the privacy circuit is to be mounted in the key telephone set, this arrangement has the additional disadvantage of using a large amount of much needed space within the key telephone set.

Accordingly, it is a general object of the present invention to design a new and improved privacy circuit for use in a key telephone set.

It is a further object to limit the number and operation of relays used in a new and improved privacy circuit so as to minimize the amount of subscriber-provided power required to operate the privacy circuit.

Another object is to allow conference connections among key telephone sets equipped with privacy circuits.

A further object is to use solid state components wherever possible so that the privacy circuit can be mounted within the key telephone station set.

SUMMARY OF THE INVENTION

These and other objects are obtained in accordance with one exemplary embodiment of the invention wherein a key telephone set is arranged with a privacy circuit which does not permit a subscriber using the key telephone set to intrude upon a call existing on a telephone line appearing at the key telephone set.

The privacy circuit comprises a single relay, first and second transistor circuitry and circuitry for sensing the busy-idle status of each line appearing at the key telephone set. Normally closed contacts of the relay connect the talking path from any selected central office line to the key telephone station handset. Thus, the operation of the relay disconnects the key telephone station handset from a selected central office line.

When a subscriber attempts to access a line the associated line key is operated and the handset is lifted. This operation causes the privacy circuit to sense the selected line to determine its busy-idle status. If the line is busy a first transistor is turned on and creates an operating path for the relay which then opens the talking path between the selected busy line and the handset. The subscriber, therefore, is not permitted to intrude or eavesdrop on the existing telephone conversation.

If, on the other hand, the subscriber is attempting to gain access to an idle central office line, the privacy circuit, after sensing the idle status of the selected line, turns on the second transistor. With the second transistor circuit on, the first transistor is held off, thereby not permitting the relay to operate. Thus the talking path between the selected idle central office line and the handset is not disturbed and the subscriber is permitted to access the idle line.

As discussed above, it is critical that the privacy circuit operate to distinguish the busy-idle status of a line whether a key station subscriber goes off-hook first and then operates a line key, or vice versa. This is accomplished by circuitry which operates when a line key is depressed. This circuitry, designated the "BD" contact, momentarily causes the station set to go on-hook for a period of time sufficient to allow the privacy circuit to determine the busy-idle status of the selected line irrespective of the condition of the switchhook.

Circuitry is also provided which permits a first subscriber, already a party to an existing conversation, to allow a second subscriber, having a key telephone set equipped with a privacy circuit, to join the existing telephone conversation. By operating a key, the first subscriber places the previously selected line in a condition which resembles an idle condition to the second subscriber. The second subscriber can then bridge the existing conversation under control of the first subscriber who allowed the bridge to occur.

It is a feature of our invention to provide a privacy circuit having a single relay operable to prevent a key telephone user from intruding on a busy central office line, thereby saving customer provided power.

It is another feature of our invention that a key is provided to permit a subscriber using a key telephone station set equipped with the inventive privacy circuit to add additional subscribers to an existing call for conference purposes.

It is another feature of our invention that a determination of the busy-idle status of the associated central office line is made without substantially disturbing or intruding on the central office line talking path.

A further feature is the design of a privacy circuit which is to be mounted and used in the key telephone set.

DESCRIPTION OF THE DRAWINGS

The foregoing objects, features and advantages of the invention will be more apparent from the following description of the drawings, in which.

Figure 1:
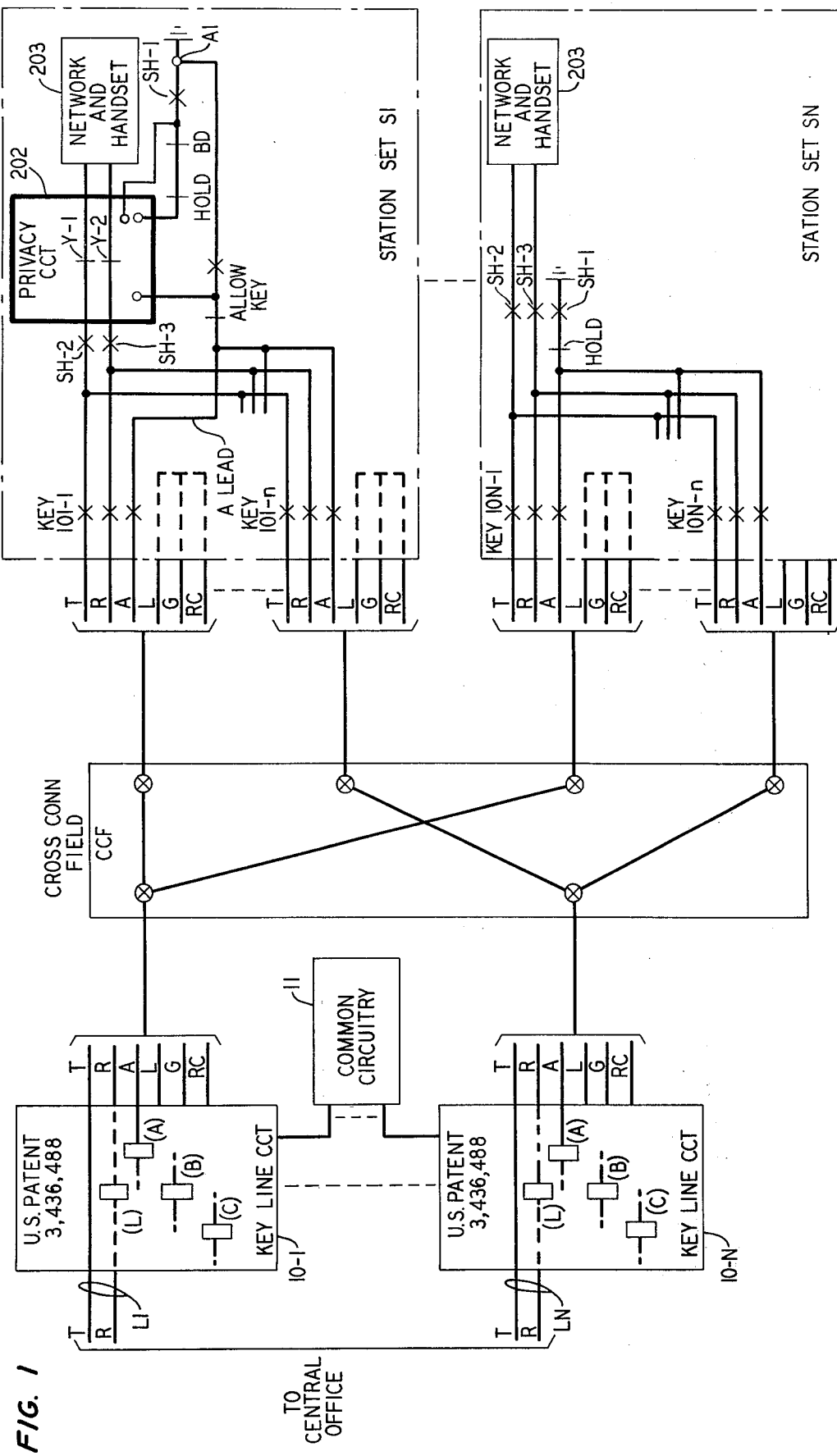
FIG. 1 is a combination sketch and block diagram and schematic drawing of a key telephone set in combination with the privacy circuit of our invention.
Figure 2:
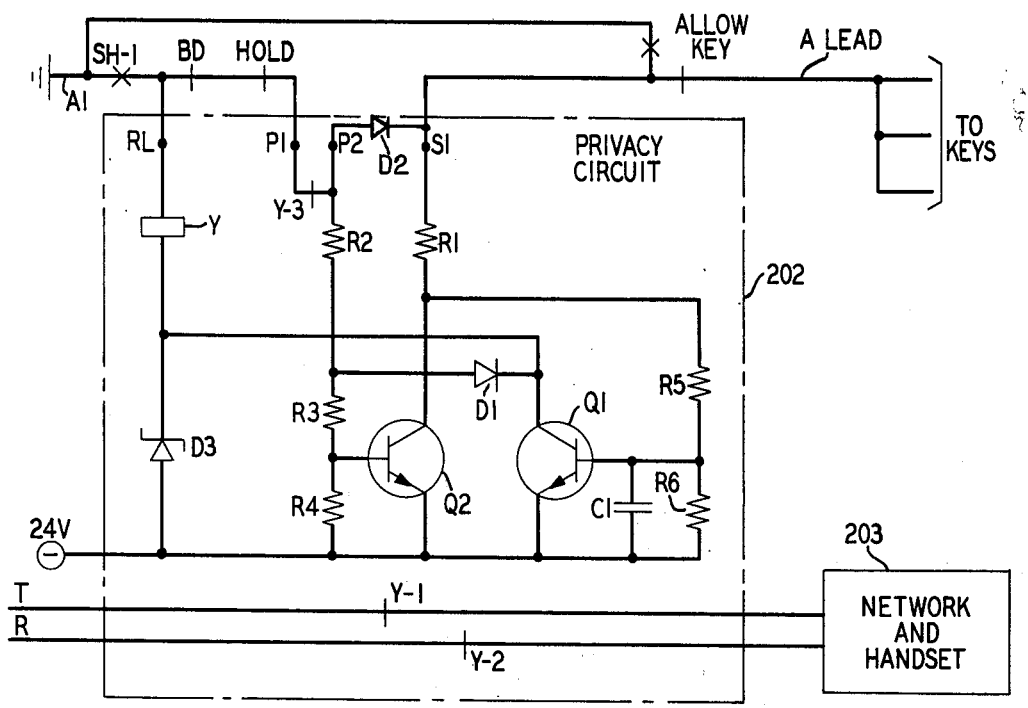
FIG. 2 is a schematic circuit drawing of the privacy circuit shown in FIG. 1.

It will be noted that FIGS. 1 and 2 employ a type of notation referred to as "detached contact" in which an "X" shown intersecting a conductor represents a normally open contact of a relay or key and a bar shown intersecting a conductor at right angles represents a normally closed contact of a relay or key, "normally" referring to the unoperated condition of the relay or key. The principles of this type of notation are described in an article entitled "An Improved Detached Contact Type Schematic Circuit Drawing" by F. T. Meyer in the September 1955 publication, *Transactions of the American Institute of the Electrical Engineers, Part 1, Communications and Electronics*, Vol. 74, pages 505–513.

General Description

FIG. 1 shows a typical key telephone system comprising a plurality of station sets, S1 through SN. Each station set, such as station set S1, has a network and handset, 203. When a subscriber lifts the handset, the noramlly open switchhook contacts, designated SH, are closed. The station set also comprises a plurality of keys, 101-1 through 102-N, with each key being individually associated with a particular central office line appearing at that station set. Each central office line, L1 through LN, comprises only two leads, designated T and R, which carry subscriber's telephone conversations.

Typically a subscriber wishing to place a telephone call from station set SN over central office line L1 would pick up the handset, thereby closing the SH contacts, and depress key 10N-1, thereby closing the contacts associated with that key. The T and R leads from the handset 203 then would be connected through the closed SH contacts, the closed key contacts associated with depressed key 10N-1, cross-connect field CCF, through the associated key line circuit 10-1 to the T and R leads of central office line L1. Additionally, the A, L, G, and RC leads are connected from station set SN to key line circuit 10-1.

FIG. 1 also shows cross-connect field CCF which is a distrubiting frame-type piece of equipment for cross-connecting the output leads from the key line circuits 10-1 through 10-N to the inputs of particular station sets having appearances of the cross-connected central office lines.

The key line cirucits 10-1 through 10-N shown in FIG. 1 are provided on a one per central office line basis in the key telephone system. The key line circuit is well known in the prior art and is described in U. S. Pat. No. 3,436,488 issued to R. E. Barbato and D. T. Davis on Apr. 1, 1969. As described above, the input to the key line circuit is the T and R talking path of the associated central office line. The outputs from each key line circuit are the T, R, A, L, G, and RC leads which are connected to a key at the station set associated with the particular line. The L, G and RC leads carry signaling information such as ringing and lamp signals from common circuitry 11 to the lamps and the ringer located at the station set. For instance, flashing lamp signals are supplied over the L lead to the connected station sets to indicate which line key is to be depressed at each station for communication with a calling line. the signaling provided on these leads is well known in the art, and, therefore, will not be described in any greater detail herein.

Additionally, each key line circuit has an individual A lead output which is connected at the associated key line circuit such that when the associated central office line is busy, the A lead has ground thereon and when the associated central office line is idle, the A lead is connected to a negative voltage through a relay coil. Thus, by monitoring the A lead, a determination can be made as to whether or not the associated central office line is busy or idle without intruding upon the central office line itself except for a few thousandths of a second during which the determination is made.

It will be noted that the two station sets S1 and SN, depicted in FIG. 1, have a major difference between them. Station set S1 has associated with it a privacy circuit 202 connected across the talking path and also connected with the A leads appearing at the station set. The station set SN, on the other hand, has no privacy circuit associated with it. The two station sets have been shown in this manner to indicate a station set equipped with the present invention, station set S1, and a station set equipped without the present invention, station set SN. The privacy circuit 202 will be described in greater detail below.

Station set S1, which has the privacy circuit 202, also has an ALLOW key. When a subscriber using station set S1 wishes to have other subscribers having privacy circuits connected to the existing call in a conference type call, the key designated ALLOW, FIG. 2, is operated. A station not equipped with the privacy feature such as SN (FIG. 1) can always bridge an existing call.

FIG. 2 depicts a more detailed circuit schematic of the privacy circuit 202 appearing in FIG. 1. The privacy circuit includes two transistors Q1 and Q2, arranged in a circuit configuration that is commonly known in the art as a binary, or a collector coupled flip-flop. Such a circuit is described at page 367 of the text book by J. Millman and H. Taub entitled *Pulse Digital and Switching Waveforms*, McGraw Hill, 1965. Basically, a binary is a circuit arrangement comprising, for instance, two transistors wherein only one of the transistors at a time is ON and while that transistor is ON the other transistor is held OFF. Thus, in FIG. 2, if transistor Q1 is ON, transistor Q12 is held OFF, and cannot be turned ON until transistor Q1 is turned OFF.

The privacy circuit also includes a single relay, the Y relay, which operates to open the normally closed contacts Y-1 and Y-2 in the T and R lead talking path. The Y relay can operate only if transistor Q1 is ON and the switchhook contacts SH are closed, as will be described in further detail below. It should be noted that in the event of a local power failure, when the Y relay cannot be operated, the normally closed contacts Y-1 and Y-2 will not disturb the T and R lead talking path.

Initially, it is assumed that the subscriber is attempting to intrude on a busy central office line, for instance, line L1, FIG. 1. For reasons which will be apparent later, a specific sequence of operations will be followed. With the key telephone set still on-hook (SH contacts open) assume the busy line L1 is preselected by depressing line key 101-1 at key telephone station set S1, FIG. 1. Since the set is on-hook, the ground on the A1 lead of FIG. 2 does not appear at the RL input of privacy circuit 201, due to the open condition of make contact SH-1. Therefore, the Y relay cannot be connected to ground through point RL. Since central office line L1 is busy, the associated A lead is interconnected with ground (V+) at the key line circuit 10-1, FIG. 1, as described above. Ground now appears at point S1 of the privacy circuit 201, FIG. 2, through the make contact of depressed key 101-1, FIG. 1, and therefore, current now flows through resistors R1, R5 and R6 to the negative 24 volt source. Capacitor C1 charges and provides potential for the operation of transistor Q1 of the binary. The collector of transistor Q1 is connected to one side of the Y relay winding and also connected through resistor R2 to diode D2. Since the subscriber has not yet gone off-hook, the SH-1 contact is still open on the A1 lead thereby not permitting collector current to pass through the relay winding. Also, the D2 diode blocks any current flow from the A lead to the collector of transistor Q1. Therefore, transistor Q1 is ON but no collector current flows. This state is called the "dry switch" state and the binary is set with Q1 ON and Q2 OFF.

As the subscriber lifts the handset and goes off-hook, contact SH-1 closes and ground is applied to the Y relay from the A1 lead. Thus current now flows from the collector of transistor Q1 via the Y relay winding and also via the parallel circuit comprising the R2 resistor and the D1 diode. The Y relay operates, thereby opening contacts Y-1 and Y-2 in the talking path comprising the T and R leads. Thus the subscriber, in attempting to intrude upon the busy central office line L1, is excluded from the line. Furthermore, the Y relay remains operated as long as the station set is off-hook and the line remains busy, since the Y-3 contact opened the A1 lead and the only base drive to transistor Q2 is from the busy A lead.

Next, it is assumed that the subscriber is attempting to gain access to an idle central office line and thus the key telephone set should not be excluded. Again, the sequence is that the key telephone set is on-hook and a line is preselected. Since the selected line is idle, the A lead associated with the selected line is connected to a negative voltage through the selected key line circuit, as mentioned above. Thus, since negative potential is extended via resistors R1 and R5 to the base of transistor Q1 and via diode D2 and resistors R2 and R3 to the base of transistor Q2, neither transistor is turned ON at this stage. When the subscriber goes off-hook, the SH-1 contact is closed and ground from lead A1 now appears at point RL and also at points P1, P2 and S1 of privacy circuit 202. Ground from point P1 is extended via released break contact Y-3, point P2, diode D2, point S1, resistors R1 and R5 to the base of transistor Q1. Ground is also extended via released break contact Y-3 and resistors R2 and R3 to the base of transistor Q2. However, capacitor C1 connected with the base of transistor Q1 delays turning ON transistor Q1 for its charge period. The base circuit associated with transistor Q2 has no time constant delay and thus transistor Q2 is turned ON immediately. With transistor Q2 of the binary ON, transistor Q1 is prevented from turning On and therefore the Y relay which operates exclusively from current supplied by transistor Q1 cannot operate. Thus, the talking path from the preselected central office line is connected to the network and handset of the key telephone set and the subscriber is given access to the idle central office line.

Summarizing briefly at this point: in the first instance, the subscriber attempted to select a busy line and then go off-hook. When the associated line key was depressed, the Q1 transistor of the binary was activated, thus going an operating path for the Y relay which relay operated when the subscriber picked on-hook. the handset. The operation of the Y relay opened the normally closed contacts Y-1 and Y-2, thus excluding the subscriber from the busy central office line. In the second instance, the subscriber attempted to gain access to an idle central office line by depressing the associated key and then going off-hook. When the associated key was depressed, neither transistor Q1 nor Q2 was turned ON but when the subscriber went off-hook, transistor Q2 was turned ON immediately, thereby preventing transistor Q1 from being turned ON and preventing the operation of the Y relay. Thus, the subscriber's connection to the idle central office line was not interrupted.

The above two situations concern a sequence of events, where the subscriber depresses the line key first and then goes off-hook. but as discussed above, the privacy circuit must also be designed so as not to be circumvented by first going off-hook and then depressing the associated line key. The following discussion will demonstrate that the circuit shown herein will still function to prevent unwanted intrusions.

In order for the privacy circuit to be able to react to the status of the selected central office line when the subscriber goes off-hook first, the key telephone set must appear idle when the central office line is selected. That is, the ground appearing at A1, FIG. 2, must be removed from points P1 and P2 so as to give the binary an opportunity to properly operate. The BD contact, FIG. 2, permits this to happen.

Figure 3:
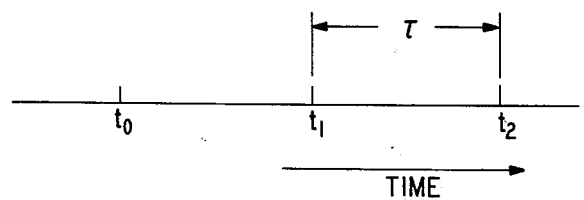
FIG. 3 is a graph representing the timing of the "BD" contacts.

It is the function of the BD contact to simulate the sequence of the subscriber depressing the line key first and then going off-hook when actually the exact opposite has occurred. The BD contact is a momentarily normally made contact which operates every time any one of the line keys is depressed or released. The operation and sequence of the BD contact and line key contacts when a line key is depressed is shown in FIG. 3.

The operation of the BD contact momentarily removes the local ground on the A1 lead to allow the privacy circuit to determine the status of the A lead before local ground is applied, just as in the two sequences described earlier.

For instance, it is assumed that the subscriber is attempting to intrude on a busy central office line by first going off-hook and then depressing the associated line key. When the subscriber goes off-hook with no line key down, transistor Q2 is turned ON and transistor Q1 is OFF, through the operation of the SH-1 contact as described above. When the line key is depresed, BD contact operates as shown in FIG. 3; at time $t_0$ in FIG. 3 BD contact breaks, thus removing ground from points P1 and P2 of privacy circuit 202, thereby removing the base drive of transistor Q2. Thus transistor Q2 turns OFF. Transistor Q1 also remains turned OFF since it also has no base drive. At time $t_1$ as shown in FIG. 3, the line key contacts make thereby interconnecting the A lead of the selected central office line with the privacy circuit. Since the associated line is busy, transistor Q1 is turned ON to dry switch again as discussed above. At time $t_2$, BD contact again closes - allowing collector current to flow from transistor Q1 thereby operating the Y relay and opening contacts Y-1 and Y-2 in the talking path. The key telephone set is then excluded from the busy central office line.

Furthermore, when a subscriber attempts to access an idle line by first going off-hook and then depressing the line key, the privacy circuit operates to permit the connection. As discussed above, before time $t_0$, FIG. 3, transistor Q1 is turned OFF and Q2 is turned ON. At time $t_0$, Q2 turns OFF. At time $t_1$, FIG. 3, the line key contacts make thereby connecting the A lead of the selected central office line with the privacy circuit. Since the associated line is idle, transistor Q2 is immediately turned ON when the BD contact closes at time $t_2$. The Y relay is prevented from operating since transistor Q1 of the binary which provides the operating current for Y relay is held OFF. Thus the subscriber's connection to the idle central office line is not interrupted.

In summary, the privacy circuit properly operates no matter how the subscriber manipulates the line keys and the switchhook.

A requirement of the BD contact is that $\tau \geq 1$ millisecond, with a nominal sample time of 60 microseconds for the privacy circuit to insure that transistor Q1 is ON. This requirement should provide sufficient tolerance to guarantee that the key telephone set will be excluded when a busy line is selected by operating the pick-up key after going off-hook.

The use of a key telephone set having a privacy circuit with an ALLOW key is also shown in FIG. 2. Once a subscriber using the key telephone set has made connection to an idle line and the binary is set with transistor Q1 OFF and transistor Q2 ON, a second station with a privacy circuit may be allowed to bridge the connection for a conference call by depressing the ALLOW key at the first station. The operation of this key opens the ground from the A1 to the A lead. Thus the ground holding the A lead busy is opened thereby forcing the A lead into an idle condition - with respect to other stations.

It should be noted that the ALLOw key operates in a two-step manner; first, point 2 is connected to point 1 at FIG. 2 and then point 1 is disconnected from the A lead (make-before-break operation). The ground appearing at A1 lead is disconected from the A lead but the ground still appears at point S1, FIG. 2. The ground at S1 assumes that the subscriber cannot intrude on any other busy lines at this time by depressing a line key other than the one presently operated since the grounded point S1 will operate transistor Q1. Therefore, the privacy circuit cannot be circumvented by manipulating the ALLOW key.

At the second, or subsequent station, the subscriber can even attempt to bridge the line by picking up the handset and depress the line key before the first subscriber has depressed the ALLOW key. If the second subscriber attempts to bridge before the first subscriber has operated the ALLOW key, transistor Q1 of the associated privacy circuit is excited and the Y relay operates as described above. Along with contacts Y-1 and Y-2 opening, contact Y-3 opens to remove ground at points P1 and P2 from the A1 lead. This base drive to transistor Q1 is provided only from the busy A lead. When the first subscriber operates the ALLOW key thereby making the line idle, this base drive is removed, transistor Q1 turns OFF releasing the Y relay and allowing the second subscriber to bridge the line.

After the second key telephone set bridges the line, the line will appear busy as a result of the ground placed on the A lead by that second station. However, the privacy circuit of the first key telephone station set will not operate to exclude the first key telephone set from the busy line when the subscriber releases the ALLOW key since transistor Q2 of the binary is already on and, therefore, the Y relay cannot operate.

To add an additional subscriber using a key telephone set with a privacy circuit to the bridged conference, all of the subscribers already connected must press the ALLOW key on their key telephone sets to force the line into an apparent idle condition, thus allowing additional subscribers to join the connection.

A subscriber using a set not equipped with a privacy circuit can allow another subscriber using a set with a privacy circuit to bridge a connection by placing the call on HOLD. The first subscriber can then reconnect to the line after the other subscriber has bridged. This is possible because without a privacy circuit, there is nothing to prevent an entry to a busy line.

The purpose of diode D1 is to block base drive to transistor Q2 through relay Y when the HOLD key is depressed and the set is off-hook. Without base drive to transistor Q2 the privacy circuit will exclude the set whenever a selected line is busy, thus preventing unwarranted access to a busy line by pressing the HOLD key.

The S1 input to the privacy circuit from the ALLOW key is used to provide a local ground from lead A1 to set the binary with Q1 ON if the ALLOW key is depressed prior to goin off-hook. This operation prevents bypassing the privacy circuit by pressing the ALLOW key while on-hoof.

While the equipment of an invention has been described with reference to a particular embodiment wheren a key telephone system is arranged with privacy circuitry, it will be obvious to the skilled in the art that the principles set forth herein may be applied in numerous other arrangements without departing from the spirit and scope of the invention.

For example, the invention may be employed in any environment wherein a number of users have access to one or more communication paths, such as party line telephone arrangments and users sharing a common data line or computer.

What is claimed is:

1. A key telephone station set having selected access to each of a plurality of central office lines appearing at said station set comprising:
    a key contact operable each time a central office line is selected from said station set for sequentially arranging said station set to be connected first in the idle state and then in the busy state,
    a privacy circuit for preventing the connection of said station set with a selected busy central office line, said privacy circuit comprising:
    means associated with said plurality of central office lines for determining the busy-idle status of a selected line during the time said station set is in said idle state,
    circuitry operable for breaking any said connection between said station set and said selected central office line,
    first solid state circuitry connected with said determining means for operating said breaking circuitry when said selected central office line is determined busy, and
    second solid state circuitry connected with said determining circuitry for preventing said first solid state circuitry from operating said breaking circuitry when said selected central office line is idle.

2. The invention as recited in claim 1 further comprising:
    a key operable for making a central office line selected at said key telephone set and connected to said station set appear idle so as to permit a second key telephone set equipped with a privacy circuit to bridge said previously selected line.

3. A privacy circuit for sensing the voltage status of an "A" lead associated with a selected central office line appearing at a key telephone station set, said privacy circuit comprising:
    first and second transistor circuits connected in a binary arrangement with the emitter of each transistor circuit connected together,
    means including resistor circuitry for connecting the base of said first transistor and the collector of said second transistor to said "A" lead,
    means including a voltage breakdown device for connecting the base of said second transistor to the collector of said first transistor,
    means for connecting the base of said second transistor to a ground connection,
    capacitance means connected between the base and emitter of said first transistor,
    means for connecting the base and emitter of said second transistor and the emitter base and said capacitance means of said first transistor to a voltage source, and
    a relay having a winding connected between the collector of said first transistor and ground, said first transistor circuit adapted to operate said relay when said "A" lead is connected to ground and said second transistor circuit adapted to operate to prevent the operation of said relay when said "A" lead is connected to a negative voltage, said relay having contacts in said central office line operable for breaking a central office line connection from said station.

4. A privacy circuit for use in a key telephone station set having ability to connect a station handset to any one of a plurality of central office lines appearing at said key telephone station set, said privacy circuit adapted to prevent the connection of said station handset with a selected busy central office line and comprising:
    means for determining the busy idle status of any selected line appearing at said key telephone station set,
    means operable for breaking any connection between said station handset and said selected central office line,
    first means operable for enabling said breaking means when said selected central office line is determined busy, so as to open said connection, and
    second means operable for preventing the enabling of said first means when said selected central office line is determined idle so as to allow said connection between said station handset and said selected central office line,
    said station set comprising a key contact operable for making said station set appear to said determining means first idle and then busy when a central office line is selected.

* * * * *